(12) United States Patent
Höfler

(10) Patent No.: US 7,381,147 B2
(45) Date of Patent: Jun. 3, 2008

(54) METHOD AND DEVICE FOR CONTROLLING FUNCTIONS OF AN OCCUPATIONAL VEHICLE

(75) Inventor: Hans Höfler, Immenstaad (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 755 days.

(21) Appl. No.: 10/520,138

(22) PCT Filed: Jul. 4, 2003

(86) PCT No.: PCT/EP03/07161

§ 371 (c)(1),
(2), (4) Date: Jan. 3, 2005

(87) PCT Pub. No.: WO2004/007234

PCT Pub. Date: Jan. 22, 2004

(65) Prior Publication Data

US 2005/0241873 A1    Nov. 3, 2005

(30) Foreign Application Priority Data

Jul. 10, 2002    (DE) ............................. 102 30 993

(51) Int. Cl.
*B60W 10/02* (2006.01)
*B60W 10/18* (2006.01)

(52) U.S. Cl. .................. 477/71; 477/74; 477/184; 477/185

(58) Field of Classification Search ............... None
See application file for complete search history.

(56) References Cited

U.S. PATENT DOCUMENTS

| | | | |
|---|---|---|---|
| 6,047,545 A | 4/2000 | Deininger | |
| 6,076,350 A | 6/2000 | Deininger | |
| 6,765,654 B2 | 7/2004 | Asaka et al. | |
| 7,267,634 B2 * | 9/2007 | Nakagawa et al. | 477/175 |
| 7,316,283 B2 * | 1/2008 | Yamamoto et al. | 180/65.2 |

FOREIGN PATENT DOCUMENTS

| | | |
|---|---|---|
| DE | 36 06 418 A1 | 9/1987 |
| DE | 41 12 503 A1 | 10/1992 |
| DE | 43 07 002 A1 | 9/1994 |
| DE | 197 42 187 A1 | 3/1999 |
| DE | 197 46 090 A1 | 3/1999 |
| DE | 199 41 876 A1 | 4/2001 |

(Continued)

*Primary Examiner*—Ha D. Ho
(74) *Attorney, Agent, or Firm*—Davis Bujold & Daniels, P.L.L.C.

(57) ABSTRACT

A method and a device for controlling functions of an occupational vehicle (1) comprising a driving motor (2), a clutch (3), a service brake (13, 14) that acts upon the wheels (11, 12) of the vehicle, a working device (21), and a hydraulic pump (15) which supplies the actuators (32) of the clutch (3), the service brake (13, 14), and the actuators (19, 20) of the working device (21) with pressure, via hydraulic pressure pipes. In order to reduce the fuel consumption, distribute in an optimal and user-relevant manner, the hydraulic pressure generated by the pump (15), and facilitate operation of such a vehicle, the clutch (3) is automatically opened and the service brake (13, 14) is automatically closed when the load acting upon the working device (21) of the vehicle exceeds a preset threshold or is actuated so as to exceed the threshold.

11 Claims, 1 Drawing Sheet

FOREIGN PATENT DOCUMENTS

| | | | |
|---|---|---|---|
| DE | 20219282 | * | 5/2004 |
| EP | 0 582 816 A1 | | 2/1994 |
| EP | 1 093 986 A2 | | 4/2001 |
| GB | 2 275 761 A | | 9/1994 |
| JP | 02113156 A | | 4/1990 |

* cited by examiner

METHOD AND DEVICE FOR CONTROLLING FUNCTIONS OF AN OCCUPATIONAL VEHICLE

This application is a national stage completion of PCT/EP2003/007161 filed Jul. 4, 2003 which claims priority from German Application Serial No. 102 30993.0 filed Jul. 10, 2002.

1. Field of the Invention

The invention concerns a method and a device for controlling the functions of a work motor vehicle.

2. Background of the Invention

Rubber tire lifters or fork lifters are among work vehicles of this type in which a vehicle motor, as a rule serves, to drive the motor vehicle via a hydrodynamic torque converter and a transmission connected after this in series. Moreover, in such motor vehicles, the drive motor drives at least one hydraulic pump, in which main or auxiliary components of the motor vehicle are provided with activation and/or control pressure. Hydraulically activatable piston-cylinder arrangements, in which the loading shovel can be moved in the case of a rubber tire lifter or the lifting fork can be moved in the case of a fork lifter, belong to the main components of the work vehicle typical in this sense. A servo-steering unit, a hydraulic clutch activation device and a hydraulic braking system can belong to the no less important auxiliary components.

Providing a hydraulic pump for each of the most important main and auxiliary components in order to be able to supply each of these components with the necessary hydraulic pressure at any time is generally known with such vehicles. Although these hydraulic designs are very simply constructed in terms of control engineering, they are disadvantageously designed in another respect, however, since these many pumps require much construction space in the motor vehicle, increase manufacturing costs and ensure a poor degree of efficiency of the drive system owing to their continuous operation.

Against this background, providing a hydraulic pump that operates in an open circuit with adjustable conveyance volume for supplying the propulsion drive, the working hydraulics and the steering system was proposed by DE 197 42 187 A1, so that instead of several pumps, only a single pump is provided for supplying the main and auxiliary components. Connecting the pump to a conveyance conduit for the hydraulic fluid in which at least one driving valve is provided is also known from this publication, wherein a priority valve for the operating hydraulic of the driving valve is present upstream of this operating valve and a priority valve for the steering is arranged upstream of this operating valve for the operating hydraulics. In this way, the steering is supplied sufficiently with pressure medium with the highest priority, while the operating hydraulics are supplied, positioned right after this steering unit in series. Moreover, it is assured that in operating states in which the propulsion drive and the operating hydraulics are simultaneously activated, the working hydraulics are first supplied with pressure medium and the pressure medium not needed by the operating hydraulics, is available for supplying the propulsion drive.

Finally, connecting a parking brake valve to the aforementioned pressure medium conveying conduit above the priority valve for the steering is known from this publication, owing to which the parking brake can be released at any time.

Other work motor vehicles, especially rubber tire lifters, are equipped with a control function, through which the driving clutch is opened via activation of the service brakes that act on the motor vehicle wheels at the beginning of the loading operation by shutting off the hydraulic activation pressure in a hydraulically activatable clutch adjustment device. By opening the driving clutch, the motor output stands almost completely available for the motor vehicle hydraulics system for activation of the piston-cylinder arrangements of the loading shovel so that, in this way, the heaving up force of the rubber tire lifter can be increased. Above all, this is conditioned by the fact that, without this control function, when the propulsion drive is cut in and the motor vehicle service brakes are activated, a very large power loss arises in the torque converter, since in this the turbine wheel almost or completely stands, while the pump wheel driven by the drive motor rotates at the so-called fixed brake rotational speed. The power uptake of the torque converter is very high in this type of operation and is largely converted into waste heat, unnecessarily increasing fuel consumption.

Up to now the described pressure shut off has been triggered manually by the driver via preselection of the control function "Pressure Shut-off in the Driving Clutch" and activation of the brake pedal. As a rule, the motor vehicle is standing here, since shutting off the hydraulic closing pressure in the activation medium of the driving clutch first takes place after closing the service brake.

This manual activation of the pressure shut off of the driving clutch by the driver is very uncomfortable, since when the function "Pressure Shut-off in the Driving Clutch" is preselected, the pedal of the service brake of the motor vehicle must activate. This requires a constant division of the driver's attention between the demands of the loading operation and those of the driving operation. Moreover, fuel consumption is unnecessarily high due to the known manual control function as described.

The objective for the invention, therefore, consists in automating the function of the pressure shut off in the hydraulic activation device of the driving clutch to relieve the attentiveness of the driver and moreover to provide control functions with which fuel consumption of such a vehicle can be reduced.

SUMMARY OF THE INVENTION

As regards the method, accordingly, it is provided that the driving clutch automatically opens and the service brake is automatically closed when the load acting upon the working device of the motor vehicle; in other words; the loading shovel of a rubber tire loader or the lifting fork of a fork lifter, exceeds a preset load threshold or is activated so as to exceed. Moreover; it can be provided that the driving clutch is opened and the service brake is closed if a pressure, force, filling state or height sensor on the working device (loading shovel or stacking fork) of a control vehicle incorporated into the motor vehicle signals that the hydraulic pressure available for the working device in drive operation with closed driving clutch does not suffice to cope with the load at hand.

The pressure increase in the control circuit of the hydraulic pump can also be used by the working device as a signal for the control device.

In another configuration of the method of the invention, it is provided that the driving clutch is open and the service brake is completely set only when the driving speed is zero or approximately zero. In this way, it is prevented that a sudden loading of the motor vehicle (such as by tearing off large fragments of earth) does not lead to a jerk-like stop of the motor vehicle. Instead of or in addition to the service brake, the parking brake of the motor vehicle can also be activated.

Furthermore, it is appropriate in this connection if the speed of travel of the motor vehicle is signaled to the control device by suitable sensors on the drive shafts of the motor vehicle wheels and/or the transmission input shafts or the transmission output shaft.

According to another aspect of the invention, a signal for changing output can be transmitted during or after opening the driving clutch by the control device, preferably to a motor control device or directly to the output regulating unit of the motor, wherein this signal as a rule triggers a reduction and if need be subsequently an increase in the power output of the motor. In this way, it is ensured that the power made free by clearing the driving clutch is not furnished to the working device (loading shovel) in sudden bursts.

Moreover, it is appropriate for the driving clutch to be closed again and the service brake and/or the parking brake to be opened when the work operation of the working device has ended, in order to enable a renewed driving operation. When closing or after closing the driving clutch and opening the service brake and/or the parking brake, the control device gives a signal for this to diminish the power output of the drive motor, preferably to the motor control device.

To implement the described control method, a control device is provided which is arranged, via sensor and control conduits, with a sensor for recording the pressure or force acting upon the working device and/or the filling status and/or the control pressure of the hydraulic pump with at least one sensor for recording the rate of travel as well as with control valves in the conduits for the working device for supplying the activating mechanism for the working device, the service and/or parking brake and the adjusting medium of the driving clutch with hydraulic pressure. Moreover, this control device is preferably connected to the motor control device via a signal conduit or directly to the power activator of the drive motor.

BRIEF DESCRIPTION OF THE DRAWINGS

The invention will now be described, by way of example, with reference to the accompanying drawings in which.

DETAILED DESCRIPTION OF THE INVENTION

Figure 1:
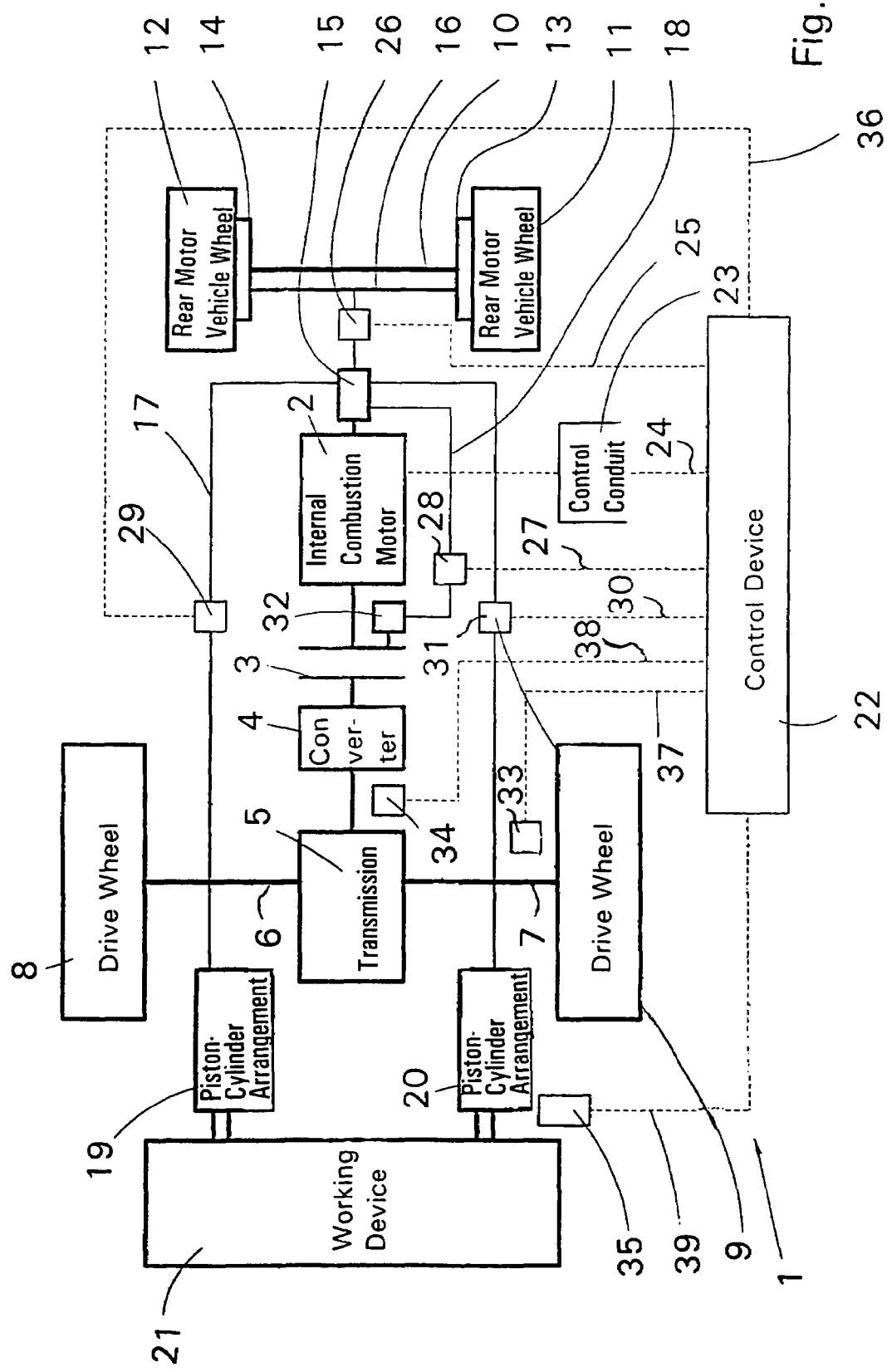
FIG. 1 is a schematic representation of a rubber tire lifter.

As can be inferred from the schematic representation of the rubber tire lifter, a work motor vehicle 1 includes, among other things, an underframe (not shown here), in which a drive motor 2 is incorporated. The drive shaft of the motor 2 drives the input side of a driving clutch 3. The driving clutch 3 can be engaged and disengaged with the aid of an activation device 32, wherein the activation device 32 can be constructed as a hydraulic piston-cylinder unit.

The turbine, thus the output side of the torque converter, stands in connection with the input shaft of a transmission 5, from which drive shafts 6, 7 for drive wheels 8, 9 of the motor vehicle 1 proceed.

Two further motor vehicle wheels 11, 12 are arranged on the motor vehicle back side, and stand in connection with each other via a rear axle 10. To simplify the representation, service brakes 13, 14 are represented only on the rear wheels 11, 12 and are constructed as drum brakes.

A loading shovel 21 is arranged at the front end of the rubber tire lifter 1 and can be activated using hydraulic piston-cylinder arrangements 19, 20.

Furthermore, a hydraulic pump 15 is provided on the back side of the drive motor 2 and is driven by a drive shaft from the motor 2. Hydraulic pressure conduits extend from this hydraulic pump 15 to the piston-cylinder arrangements 19, 20 on the loading shovel 21 to the service brake 13, 14 as well as to the clutch activation device 32. Electrically activatable valves 26, 28, 29, 31 are tied into these hydraulic pressure conduits with which the aforementioned devices to be hydraulically activated can be controlled, wherein the valves 29 and 31 can also be pressure sensors for the control circuit.

A control device 22 is provided to control valves 26, 28, 29, 31 which stands in connection with the aforementioned valves via control conduits 25, 27, 30 and 36. Moreover, rotational speed sensors 33, 34 are recognizable on the wheel drive shaft 7 and the transmission input shaft and provide the control device 22 with information via sensor conduits 37 regarding the drive shaft rotational speed or the transmission input shaft rotational speed, which then is converted into the rate of travel of the motor vehicle in the control device 22. There also exists the possibility of arranging a sensor on the transmission output shaft.

In accordance with the invention, this work motor vehicle 1 is operated such that when the load acting upon the loading shovel 21 of the rubber tire lifter exceeds a present loading threshold; in other words, perhaps a specified weight load, the driving clutch 3 is opened by the activation device 32 and the service brake 13, 14 is set. The control device 22 gives corresponding control orders to the hydraulic valves 26 and 28 for this if the pressure, force and/or filling status sensor 35 signals that the incident hydraulic pressure no longer suffices to master the load incident upon the loading shovel 21. In this way, the turbine rotational speed of the torque converter rises from a near standstill, whereby the uptake power of the torque converter drops.

In order now to realize an especially comfortable working behavior for this vehicle, it is provided in this exemplary embodiment that the control device 22 issues a signal for changing the motor power directly to the output control device of the drive motor 2, or through a motor control device 23, to the power control device 22 through a control conduit 24 when, due to the changed load situation, an increased or reduced motor torque is necessary or appropriate for generating increased or reduced hydraulic activation pressures. In particular when opening the driving clutch 3, it is appropriate to lower motor power together with opening the driving clutch and closing the service brake to avoid a motor power available in bursts, whereby this appropriately takes place as a function of the load on the loading shovel 21 detected with the pressure, force and/or filling status sensor 35.

The procedure is the same as with the subsequent closing of the driving clutch. Here too, it is necessary to reduce the drive power of the motor first, proceeding from a high motor power to generate a high working pressure for the loading shovel in order to raise this again, if need be, after closing the driving clutch.

In order to allow the opening of the driving clutch 3 and the closing of the service brake 13, 14 when a large load is on the loading shovel 21 to occur only when the vehicle 1 is at a standstill or at least at low rates of travel, the speed of travel of the motor vehicle 1 is ascertained via the described rotational speed sensors 33 or 34.

The above-described control and, if necessary, regulation functions can also be stored in available control and regulation systems of a motor vehicle and carried out there. The transmission control device or the motor control device is suited for this, for example.

REFERENCE NUMERALS

1 Work motor vehicle
2 Internal combustion motor
3 Driving clutch
4 Hydrodynamic converter
5 Transmission
6 Drive shaft
7 Drive shaft
8 Drive wheel
9 Drive wheel
10 Rear axle
11 Rear motor vehicle wheel
12 Rear motor vehicle wheel
13 Service brake
14 Service brake
15 Pump
16 Pressure conduit
17 Pressure conduit
18 Pressure conduit
19 Piston-cylinder arrangement
20 Piston-cylinder arrangement
21 Working device, loading shovel
22 Control device
23 Motor control device
24 Control conduit
25 Control conduit
26 Control valve
27 Control conduit
28 Control valve
29 Control valve
30 Control conduit
31 Control valve
32 Clutch activation device
33 Rotational speed sensor
34 Rotational speed sensor
35 Pressure, force and/or filling state height sensor
36 Control conduit
37 Sensor conduit
38 Sensor conduit
39 Sensor conduit

The invention claimed is:

1. A method for controlling functions of a motor vehicle (1) comprising a drive motor (2), a driving clutch (3), a service brake (13, 14) that acts upon wheels (11, 12), a working device (21) and a hydraulic pump (15) that supplies actuators on the driving clutch (3), the service brake (13, 14) and the working device (21) with pressure medium via hydraulic pressure conduits, the method comprising the step of automatically opening the driving clutch (3) and automatically closing the service brake (13, 14) when a load acting upon the working device (21) of the motor vehicle exceeds a predetermined load threshold or is activated so as to exceed.

2. The method according to claim 1 further comprising the step of opening the driving clutch (3) and closing the service brake (13, 14) when one or more of a pressure, a force and a filling state height sensor (35) on the working device (21) signals a control device (22) that hydraulic pressure available for a propulsion operation of the working device (21) is no longer sufficient to master a load at hand.

3. The method according to claim 1 further comprising the step of activating the opening of the driving clutch (3) and closing of the service brake (13, 14) when a speed of travel is one of zero or approximately zero.

4. The method according to claim 3 further comprising the step of signaling the speed of travel of the motor vehicle to a control device (22) via sensors (33, 34) on one or more of drive or output shafts (6, 7) of the wheels (8, 9) and on a transmission input shaft.

5. The method according to claim 1, further comprising the step of activating a parking brake of the motor vehicle instead of or in addition to the service brake (13, 14).

6. The method according to claim 1, further comprising the step of, one of during or after opening the driving clutch (3), transmitting via a control device (22) a signal for changing power to one of a motor control device (23) or directly to an output regulating device of the drive motor (2).

7. The method according to claim 6, further comprising the step of using the signal to the motor control device (23) to trigger a reduction in power output of the motor (2).

8. The method according to claim 1, further comprising the step of closing the driving clutch and opening one or more of the service brake (13, 14) and a parking brake upon ending a working operation of the working device (21).

9. The method according to claim 8, further comprising the step of, one of during closing or after closing the driving clutch (3) and opening one or more of the service brake (13,14) and the parking brake, issuing via the control device (22) a signal to change a power output of the drive motor (2).

10. A device for controlling functions of a work motor vehicle (1) with a drive motor (2), a driving clutch (3), a service brake (13, 14) that acts on motor vehicle wheels (11, 12), a working device (21) and with a hydraulic pump (15), which supplies actuators on the driving clutch (3), on the service brake (13, 14) and on the working device (21) with pressure medium through hydraulic pressure conduits, wherein the driving clutch (3) is automatically opened and the service brake (13, 14) is automatically closed when a load acting upon the working device (21) of the motor vehicle exceeds a preset load threshold or is activated so as to exceed.

11. The device according to claim 10, wherein a control device (22) is connected by a control conduit (24) via one of a motor control device (23) or directly to a power regulation device of the drive motor (2).

* * * * *